United States Patent [19]

Hooper

[11] Patent Number: 5,002,741

[45] Date of Patent: Mar. 26, 1991

[54] METHOD FOR $SO_X/NO_X$ POLLUTION CONTROL

[75] Inventor: Richard G. Hooper, Littleton, Colo.

[73] Assignee: Natec Resources Inc., Houston, Tex.

[21] Appl. No.: 437,617

[22] Filed: Nov. 16, 1989

[51] Int. Cl.$^5$ .......................... B01J 8/00; C01B 21/00; C01B 17/00

[52] U.S. Cl. .................................... 423/239; 423/235; 423/244

[58] Field of Search .................. 423/235, 235 D, 239, 423/239 A, 244 A, 224 R

[56] References Cited

U.S. PATENT DOCUMENTS

| | | | |
|---|---|---|---|
| 2,992,895 | 7/1961 | Feustal et al. | 423/239 |
| 4,208,386 | 6/1980 | Arand et al. | 423/235 |
| 4,767,605 | 8/1988 | Lindbauer et al. | 423/235 |
| 4,844,915 | 7/1989 | Hooper | 423/235 |
| 4,844,915 | 7/1989 | Hooper | 423/235 |
| 4,908,194 | 3/1990 | Hopper | 423/235 |

Primary Examiner—Gregory A. Heller
Attorney, Agent, or Firm—The Dulin Law Firm

[57] ABSTRACT $SO_x/NO_x$ pollution control process comprising injecting into flue gas from 1 to 50% carbon (preferably 5-15%) along with a dry, finely divided sodium sorbent, preferably sodium bicarbonate or Nahcolite, a naturally occurring form of sodium bicarbonate. The process removes both $SO_x$ and $NO_x$ from the flue gases of utility and industrial plants, incinerators and the like by dry injection into a flue gas duct a sufficient distance upstream of a particulate collection device, such as an ESP or baghouse, to collect spent reagent and additive. The sodium reagent reacts with the $SO_2$ to form sodium sulfate and also removes $NO_x$ in the form to NO. The carbon additive reacts with $NO_2$ to reduce the concentration of the $NO_2$ in the exit flue gases to below the $NO_2$ brown plume visibility threshold (about 30 ppm $NO_2$, not corrected to 0% $O_2$, depending on stack diameter and ambient conditions). The additive may be used alone or in conjunction with other adjuvants or additive such as urea or ammonia. The carbon must have a high effective surface area to be active is suppressing NO to $NO_2$ conversion, and is preferably present in, on, in association with, or mixed with, an inert carrier, such as fly ash. Preferably, the "C factor", which is the product of the fraction of carbon in the additive times the effective surface area of the carbon in the additive, is above 1.

49 Claims, 2 Drawing Sheets

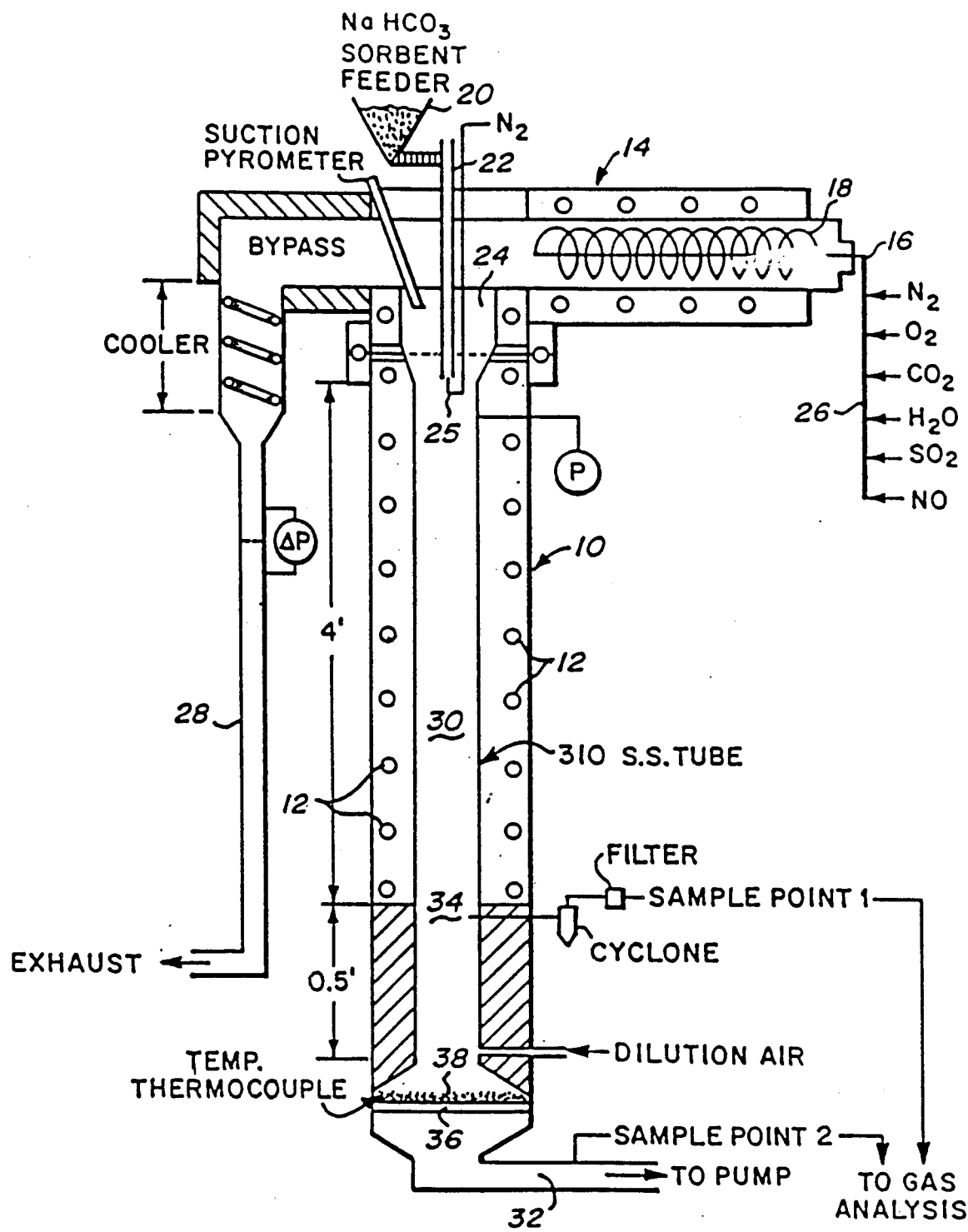

METHOD FOR SO$_X$/NO$_X$ POLLUTION CONTROL

FIELD

The invention relates broadly to a method for baghouse SO$_x$/NO$_x$ pollution control, and more specifically to a method for control of the NO$_2$-caused brown plume coloration associated with the injection of sodium reagents into the flue gas duct work ahead of particulate control/collection device(s), such as an ESP or a baghouse, to remove SO$_2$ from industrial and utility plants that fire (burn) fossil fuels or wastes to generate electricity, steam or heat. More particularly, the method of the invention employs sodium bicarbonate (preferably nahcolite) plus finely divided carbon, alone or in conjunction with a carrier such as fly ash, to react with NO$_2$, thus reducing plume coloration in exit flue gases.

BACKGROUND

The increasing use of sulfur-containing fuels as energy sources, namely coal and oil, has resulted in pollution of the atmosphere throughout the world. The burning of the fuel produces flue gases containing substantial quantities of SO$_x$, predominantly SO$_2$ and SO$_3$.

A wide variety of processes have been proposed for the removal of the SO$_2$ from flue gases before they are emitted to the atmosphere. Processes using dry solids, liquids or slurries of sorbents injected in a manner to directly contact the flue gases have proven to be effective for control of SO$_2$ emissions. Of these, the calcium-based wet scrubber systems have experienced the greatest use in industrial and utility application. This involves finely grinding lime or limestone of suitable composition, forming a water slurry or mixture, and providing apparatus and method for slurry contact with the flue gases. The SO$_2$ reacts with the calcium reagent to form calcium sulfate/sulfite which is collected and removed in the form of a generally thixotropic sludge. This sludge is usually difficult to dispose because it does not easily dewater, and heavy metals can leach from the waste sludge containment ponds.

Further, abrasion to the slurry pumps and other scrubber handling equipment (due to the hardness of the limestone particles) increases maintenance costs. The operating costs are increased because the evaporation of water in the system cools the flue gases nominally by 200° F. The moist flue gases, containing as they do some residual dissolved SO$_x$, are also acidic. In addition, where the utility or industrial plant is located in an arid region, the water requirements of a wet pollution control process are expensive and drain an already scarce natural resource.

The subject of flue gas desulfurization by the injection of dry sodium-based reagents has been extensively investigated in laboratory, pilot, and full scale applications since the 1960's. These investigations have provided the technical basis to evaluate the economic aspects of the technology and compare its advantages to the current calcium-based technologies. The injection of dry reagents clearly is the least demanding of capital funds for both new and retrofit applications. The use of familiar hardware such as pulverizers, blowers, and silos permit the easy installation and operation of this simple technology.

Accordingly, the injection of dry reagents into flue gases has become of increasing interest. Principal among these is the use of sodium compounds as a reagent or sorbent. Sodium-based reagents that have been used are commercial sodium bicarbonate (NaHCO$_3$), light and dense soda ash (Na$_2$CO$_3$), sodium sesquicarbonate (Na$_2$CO$_3$NaHCO$_3$2H$_2$O), trona (a naturally occurring form of sodium sesquicarbonate), and Nahcolite (a naturally occurring form of sodium bicarbonate). The reagents of greatest effectiveness are commercial sodium bicarbonate and Nahcolite. The sodium bicarbonate or Nahcolite is injected into the flue gas duct of a utility or industrial plant, and reacts with SO$_2$ in the gas stream to produce Na$_2$SO$_4$ which is collected in a baghouse or on plates of an ESP.

However, I have observed that the use of sodium can result in production of a reddish-brown plume coloration in stack gases downstream of the particulate control device. The use of the sodium bicarbonate not only removes SO$_2$, but also removes some NO$_x$ (NO and NO$_2$). While the precise mechanism is not known at this time, it is presently thought that some step within the overall sulfation reaction (reaction of sodium reagent with SO$_x$) initiates the oxidation of NO to NO$_2$. It is the presence of the NO$_2$ in the exiting flue gases which is the source of the plume coloration.

Accordingly, this promising sodium reagent SO$_x$ control process has a serious disadvantage, in that its use creates an NO$_2$ plume in the process of its removal of SO$_x$ pollution from flue gases.

Recently, I have disclosed and claimed in copending Ser. No. 174,654 filed Mar. 29, 1988 now U.S. Pat. No. 4,909,194, and in U.S. Pat. 4,844,915 issued July 4, 1989, that urea can be used in conjunction with sodium bicarbonate in baghouses (U.S. Pat. No. 4,908,194) and electrostatic precipitators (U.S. Pat. No. 4,844,915) to block the interference of NO in the bicarbonate sulfation reaction. The urea interferes with the NO to NO$_2$ conversion, thereby reducing NO$_2$ production while simultaneously increasing the SO$_x$ removal (reducing the bicarb stoichiometric ratio to near theoretical). This effect of urea on bicarbonate for removal of SO$_x$ and NO$_x$ in baghouses was reported publicly by me in an EPRI-sponsored industry Forum entitled "SO$_x$, NO$_x$, and Rocks Without A Brown Plume" in Denver, Colorado on Mar. 31, 1987.

Accordingly, there is a need for additives and methods by which the NO$_2$ produced by the use of sodium SO$_x$ sorbents can also be removed or suppressed, while not sacrificing SO$_x$ removal. This invention permits the injection of dry sodium reagents ahead of a particulate collection device, such as baghouse or ESP, without production of the plume.

THE INVENTION

OBJECTS

It is among the objects of this invention to provide a method for suppression of NO$_2$ emissions during the injection of dry sodium reagents ahead of a particulate control device such as a baghouse or ESP, more particularly during injection of sodium carbonate/bicarbonate compounds into flue gases of utility and industrial plants ahead of a baghouse or ESP for removal of SO$_x$.

It is another object of this invention to provide a method for use of particulate carbon in a variety of forms from a variety of sources in conjunction with dry sodium reagents in a baghouse or ESP process for suppression of formation of NO$_2$ while simultaneously removing SO$_x$.

It is another object of this invention to provide a novel sorbent composition for introduction into the flue gases of such plants for suppression of formation of $NO_2$ or removal of $NO_x$, while simultaneously removing $SO_x$.

It is another object of this invention to provide a method of $NO_x$ removal or suppression of $NO_2$ by introduction of finely divided carbon, alone or in conjunction with a carrier such as fly ash, in combination with a sodium bicarbonate reagent into the flue gas of such plants ahead of a particulate collection device.

Still other objects of this invention will be evident from the Summary, Drawings, Detailed Description, Abstract and Claims of this case.

SUMMARY

The method of this invention comprises the introduction of a sodium $SO_x$ sorbent (herein also termed sodium reagent), preferably commercial sodium bicarbonate or Nahcolite (either or both herein termed "bicarb"), in a finely divided dry form, into the flue gas of a utility or industrial plant ahead of a particulate control device, such as a baghouse or ESP (herein PCD), below about 2.5 Normalized Stoichiometric Ratio of the $SO_x$ to be removed and preferably in the range of from about 0.1 to 1.5 NSR, along with the separate or simultaneous injection of an additive selected from finely divided particulate carbon, alone or preferably in conjunction with a carrier, such as but not limited to fly ash, in the range of from about 1% to 50% by weight carbon to the weight of the reagent. The amount of carbon, or carbon plus carrier injected is preferably about 5 to 15% by weight of the reagent, e.g. bicarb. The term "carbon" as used herein includes carbon alone or in conjunction with a carrier such as fly ash. In addition to bicarb, sodium carbonate (soda ash), trona, carbonated trona, sodium sesquicarbonate or sodium tricarbonate may be used.

The additive may be introduced in any form, but preferably in a dry, finely divided powder. Both the additive and reagent, e.g. bicarb, are injected evenly throughout the gas stream ahead of the PCD. The reaction products collected by the PCD can be disposed in the same manner as sodium reagents used without the use of the additive. Surprisingly, I have discovered not only that carbon has a suppressive effect on $NO_2$ emissions, but also that this effect is enhanced in the presence of, or as a combination with, an inert carrier such as fly ash. While ash alone seems to have some $NO_2$ suppression effect, it would require adding so much ash to $SO_x$-containing flue gases in the presence of sodium sorbents to come below the $NO_2$ brown plume threshold as to be economically unfeasible. But once carbon is added the resultant increase in $NO_2$ emission suppression (as compared to ash or carbon alone) is clearly synergistic.

While I do not wish to be bound by theory, I presently believe the reaction of the oxides of sulfur ($SO_2$, $SO_3$) in the flue gas occurs with sodium carbonate ($Na_2CO_3$), the product of the thermal decomposition of Nahcolite or sodium bicarbonate ($NaHCO_3$). Therefore, when sodium bicarbonate/Nahcolite (herein bicarb) is injected, the first step necessary for $SO_2$ removal is the decomposition into sodium carbonate:

$$2NaHCO_3 \rightarrow Na_2CO_3 + H_2O + CO_2 \quad (1)$$

The rate of the decomposition of the bicarb controls the distance downstream of the injection location where the $SO_2$ reaction begins. Generally speaking, the temperature of the particular flue gas at the injection location determines the rate of decomposition, the higher the temperature, the faster the decomposition. Other factors influencing decomposition rate include coal type, fly ash composition, and $CO_2$, NO and humidity in the flue gas.

Once the decomposition has proceeded sufficiently to provide sites of sodium carbonate, the $SO_2$ then rapidly reacts according to the following overall reaction:

$$Na_2CO_3 + SO_2 + 1/2 O_2 \rightarrow Na_2SO_4 + CO_2 \quad (2)$$

In the process, there is substantial oxidation of nitrogen oxide (NO) to nitrogen dioxide ($NO_2$) in the ratio of about 0.2 the amount of $SO_2$ removal. Some, but not all of the $NO_2$ reacts with the carbonates and/or sulfates produced by the injection of the reagent. The remaining unreacted $NO_2$ exits the PCD and is responsible for producing a reddish-brown plume coloration, when $NO_2$ concentrations are high enough under certain atmospheric conditions.

Surprisingly, the use of finely divided carbon of high specific surface area along with the bicarb reagent reduces or eliminates the unreacted $NO_2$ from the exit gas stream and thereby prevents the unwanted plume coloration. The finely divided carbon may be added in intimate admixture to the sodium (e.g., bicarb) reagent just prior to its introduction into the flue gas. This mixed carbon/bicarb reagent composition may also be pre-prepared and stored for use in bags or in bulk. Alternately, the carbon may be injected separately from the bicarb reagent, preferably simultaneously and in close proximity to the point of introduction of the bicarb, but may also be injected upstream or downstream of the point of bicarb injection.

The carbon may be used in a variety of forms, preferably finely divided activated carbon having a large surface area. In addition the carbon may be mixed with, or coated or formed on inert carriers, such as finely divided fly ash. In a preferred alternative of carbon plus inert carrier, the carbon is produced in association with ash by incomplete combustion of a fossil fuel or waste, such as coal (preferred), oil or municipal incinerator waste. Carbon alone may be added to flue gas already containing sufficient quantities of fly ash as a carrier, or carbon/ash additive may be injected in the flue gas ahead of, along with, or after (downstream of) bicarb injection. The fossil fuel burn conditions can also be controlled to produce the desired carbon/ash content in the flue gas so that all that needs to be injected is the bicarb or other sodium sorbent; however, this method of operation may be so fuel-inefficient that separate additions of carbon and bicarb, or carbon/ash plus bicarb as a mix, are preferred.

The effect of carbon in reducing $NO_2$ emission was first observed during fluidized bed tests wherein a simulated flue gas is used to fluidize a bed of sodium bicarbonate. Carbon additives, such as high carbon content ashes, were injected in the bed, and the $SO_x/NO_x$ emissions before and after injection were analyzed. The $NO_x$ reduction was then quantitatively confirmed in plug flow reactor tests described in more detail below. A wide variety of sources of carbon were tested, including: activated carbon (Allied Chemical); carbon black (Sargent Welch); and coal char in ash. To compare the effect of these carbons on equal terms, the activated carbon and carbon black were mixed with coal ash, and in all cases the percent carbon quoted is relative to the ash before injection into the flue gas stream in association with NaHCO$_3$ or other sodium sorbent.

Surface areas for the various carbon sources ranged from >1,000 m$^2$/g to about 2.1 m$^2$/g. The highest surface area carbon was the activated carbon which has a surface area in excess of 1,000 m$^2$/g. The coal chars had surface areas in the range 40–60 m$^2$/g, assuming the ash component had a surface area of about 1 m$^2$/g. The carbon black had a surface area of about 30 m$^2$/g and should have the smallest particle size distribution of the carbons tested.

The results from the carbon tests in the plug flow reactor showed that the presence of carbon decreased the emissions of NO$_2$ for a given SO$_2$ removal by the bicarb. Without being bound by theory, I believe the NO$_2$ emissions are reduced due to reaction of NO$_2$ with carbon following bicarb sorption of (reaction with) SO$_2$. As first shown in the fluidized bed tests, NO$_2$ reacts with carbon to form NO and CO$_2$:

$$C + 2NO_2 \rightarrow = 2NO + CO_2 \tag{3}$$

The plug flow reactor results also indicate approximately a 1/1 NO/NO$_2$ ratio for a given carbon level, indicating NO$_2$ is being converted to NO.

The activated carbon was significantly more effective per pound added than the other carbon types with 60% NO$_2$ removal (reduction) achieved with 5% activated carbon added to the inert carrier (Arapahoe ash). Forty to fifty percent coal char in the ash carrier was required to achieve the same NO$_2$ reduction.

Assuming 2 moles of NO$_2$ react with one mole of carbon, an excess of carbon was always available for reaction with NO$_2$. For example, 5% carbon by weight is equivalent to a 2.3 C/NO$_2$ molar ratio for a initial NO$_2$ concentration of 200 ppm. A large percentage of the carbon therefore passes through unreacted, as was observed in solids analysis of the spent sorbent plus additive (reacted NaHCO$_3$, principally, Na$_2$SO$_4$, residual Na$_2$CO$_3$ and carbon, and carrier such as ash).

Experiments were also conducted placing a bed of carbon onto the filter and then injecting only NaHCO$_3$ to study separate injection of carbon and NaHCO$_3$ as compared to the simultaneous injection of C or carbon-/ash plus NaHCO$_3$. The carbon on the bed was also effective in reducing NO$_2$ emissions giving a 40% NO$_2$ reduction relative to NaHCO$_3$ alone for the same SO$_2$ removal. The amount of carbon precoated on the filter (5 g) is equivalent to the amount of carbon that would be injected over 30 minutes at a 10% carbon/ash rate.

DRAWINGS

The invention is further illustrated in connection with the drawings in which:

FIG. 2 is a schematic of the isothermal plug flow reactor used for sorption of SO$_2$ by bicarbonate in accord with this invention.

DETAILED DESCRIPTION OF THE BEST MODE—EXAMPLES

Figure 1:
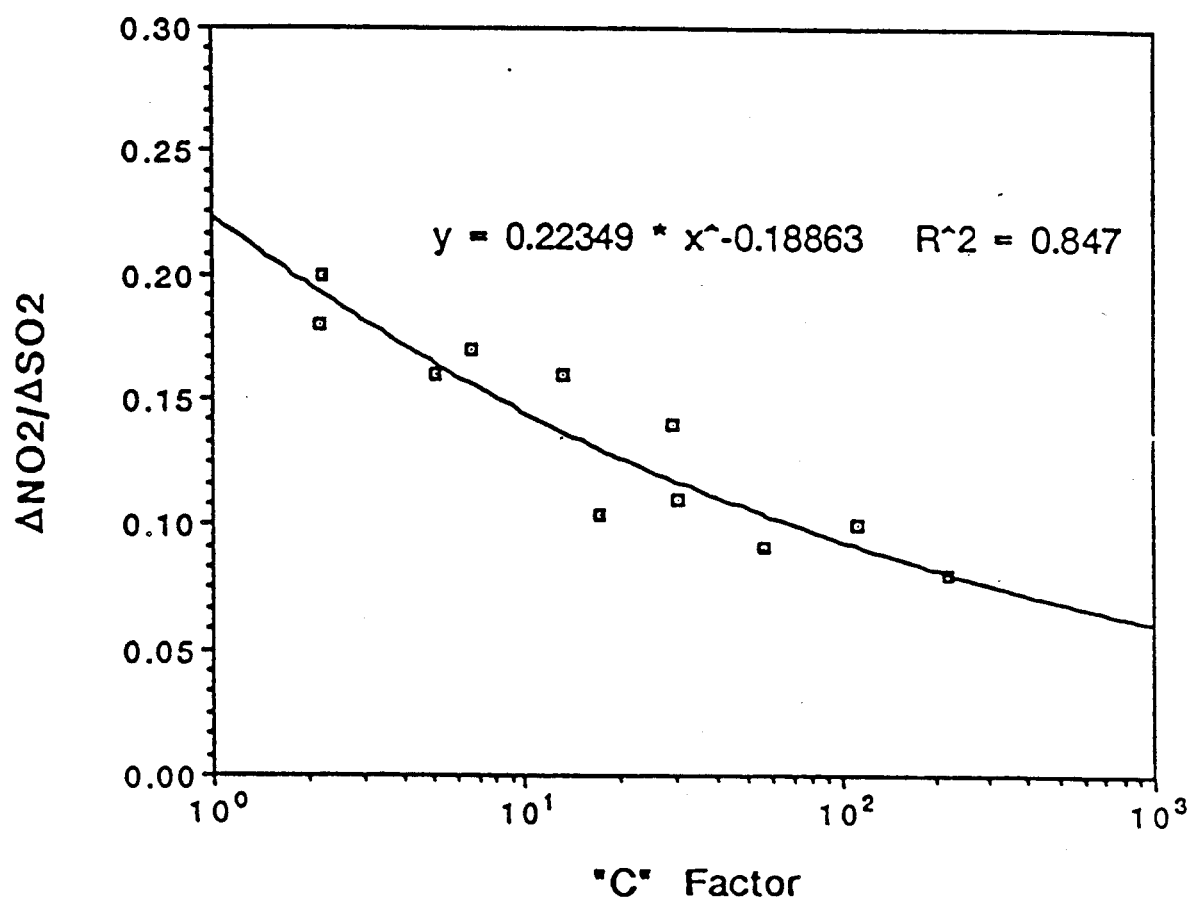
FIG. 1 is a graph showing the effects of carbon addition when injecting sodium bicarbonate for flue gas desulfurization in terms of change in the ratio of $\Delta NO_2/\Delta SO_2$ versus carbon addition at 350° F. in terms of the "C Factor".

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

While the terms sodium sorbent, "bicarb," sodium bicarbonate, Nahcolite, and sodium reagent are used interchangeably throughout in a generic descriptive context, the tested reagent (or sorbent) was commercial sodium bicarbonate. The term "reagent" means the sodium reagent alone. The term "carbon", "additive", "adjuvant" or "C" means carbon alone or carbon in, on, in association with, or admixed with an inert carrier such as ash. The term "C+A" or C/A means carbon in, on, in association with, or admixed with the carrier. The test results are shown as the data points on the graph of FIG. 1 as the simplest, most direct way of recording the data and illustrating the relationship observed.

TEST SET-UP

A schematic of the isothermal plug flow reactor used for the test examples is shown in FIG. 2. The reactor 10 consists of five independently controlled, electrically heated sections, the coils of which are shown in section as circles 12. Flue gases are blended in a preheat section 14 upstream of the reactor tube inlet 16 and then passed through a coil 18 in which the desired gas temperature is obtained. The heaters 12 in the test section 30 maintain the gas temperature constant to ±10° F. Solids are injected with a screw feeder 20 placed above the reactor. The solids are transported with N$_2$ through a tube 22 centered at the entrance 24 to the test section 30 using a separate N$_2$ stream.

To set test conditions, dopant (upper right in FIG. 2) gases are individually metered through calibrated rotameters into the gas mixing manifold 26, and thence into the reaction chamber 30. Once the desired test conditions have been reached, the sorbent or sorbent-/additive mixture is instantaneously injected into the reaction chamber 30. Exhaust gas compounds exiting the reactor at 32 are continuously monitored in the parts per million range (ppm) for SO$_2$, NO, NO$_x$, NO$_2$, and CO; O$_2$ and CO$_2$ concentrations are measured in percent. At the conclusion of each run, solids remaining in the reactor were analyzed. Item 28 is a bypass exhaust manifold.

Gas sampling locations were at the reactor bottom 34 upstream of the filter 36, at Sample Point 1 (1.5 seconds residence time), and just downstream of the filter at Sample Point 2. The filter was a piece of baghouse fiberglass bag filter fabric. The gas analysis instruments used for these experiments were as follows: Continuous analyzers measured O$_2$, CO, CO$_2$, NO, and NO$_2$. Two Thermo-electron chemiluminescence analyzers were used to measure NO and NO$_x$ (NO+NO$_2$). The NO$_2$ was analyzed with a duPont U.V. NO$_2$ analyzer, the SO$_2$ with a duPont analyzer, O$_2$ with a Teledyne unit, and CO and CO$_2$ with Horiba units. All analyzers were upstream of a sample bag.

A grab sample of reactor gas was withdrawn via Sample Point 1 and the sample bag filled with gas analyzed by gas chromatograph for N$_2$O concentration.

The solids 38 deposit on the 8"×10" filter at the reactor bottom. At the conclusion of the test the filter together with the collected solid was removed and the solid was deposited in a sample bottle. The filter was then cleaned and replaced at the bottom of the reactor. Samples of solids were analyzed for C, H, N, SO$_4$, SO$_3$, and NO$_3$.

SORBENT AND ADDITIVE COMPOSITIONS

Three sodium bicarbonate materials and one sesquicarbonate were tested during these tests. The three NaHCO$_3$ compounds, all supplied by Church & Dwight, were 3DF, feed grade sodium bicarbonate and food grade sodium bicarbonate. The mass mean diameter of the compounds were: 3DF-31 MM, feedgrade-114 MM, and foodgrade-47 MM. In the text below the feedgrade is abbreviated as "FG", while the foodgrade is called "A+H".

The carbon additive of this invention (C+A), except for the tests employing carbon black or activated carbon (including a precoat of activated carbon on the filter 36), was provided as a high unburned-carbon content ash. The ash is preferably a fly ash. This was done to simulate real power plant boiler ash so that the process of this invention could provide a co-disposal option of disposal of some powerplant waste fly ash, after treatment in accord with this invention to provide sufficient high surface area carbon content. Normal power plant waste fly ash has negligible carbon content or negligible content of the requisite high surface area carbon.

Table I below lists the carbon contents of the special carbon/ash additives used during these test examples. The Arapahoe ash, which is about 1% carbon, is from a full scale power plant operation. The lignite, Virginia and Hallmark ash were produced by specially burning the coals in a pilot furnace to simulate, on a small scale, power plant boiler conditions (not an ashing furnace). As seen in Table I, these ashes had high unburned-carbon contents ranging from 15% to 46%. To show that barren ash (ash free of carbon) was not effective, these ashes were placed into a muffle furnace and the residual carbon was burned off. Table II below shows the ash composition for the Arapahoe, Hallmark and Virginia coal ashes. Both the Arapahoe and Virginia coal ashes are primarily composed of alumina and silica compound while the Hallmark ash is primarily Fe$_2$O$_3$.

TABLE I

| CARBON CONTENT | |
|---|---|
| Ash | Carbon Content, % |
| Arapahoe | 1.1 |
| Hallmark | 45.9 |
| Virginia | 43.3 |
| Lignite | 15.0 |

TABLE II

| ASH MINERAL COMPOSITION | | | |
|---|---|---|---|
| | Arapahoe Wt. % | Hallmark Wt. % | Virginia Wt. % |
| Na$_2$O | 1.53 | 4.93 | 0.94 |
| MgO | 1.29 | 1.55 | 1.31 |
| Al$_2$O$_3$ | 22.54 | 12.19 | 25.04 |
| SiO$_2$ | 49.53 | 18.02 | 33.14 |
| P$_2$O$_5$ | 0.70 | 0.17 | 0.20 |
| S | 0.11 | 5.67 | 5.37 |
| Cl | — | 4.62 | 2.17 |
| K$_2$O | 1.11 | 1.64 | 1.42 |

TABLE II-continued

| ASH MINERAL COMPOSITION | | | |
|---|---|---|---|
| | Arapahoe Wt. % | Hallmark Wt. % | Virginia Wt. % |
| CaO | 4.28 | 6.49 | 8.97 |
| TiO$_2$ | 0.80 | 0.86 | 1.67 |
| MnO | 0.03 | 0.23 | 0.18 |
| Fe$_2$O$_3$ | 3.59 | 41.49 | 17.19 |
| BaO | 0.81 | 0.23 | 0.11 |

Table III shows the surface area of various carbon sources in m$^2$/g and the "effective surface area of carbon in additive" ("additive" being C+A), which effective surface area is either measured or is calculated, using the concentration of carbon in the additive sample and measured surface area of the mixed ash/carbon additive sample in accord with the formula:

$$M_{SAS}[C](E_{SAC}) + [A](M_{SAA})$$

That is: Measured Surface Area of Additive Sample equals (Concentration of Carbon)(Effective Surface Area of Carbon in Additive Sample)+(Concentration of Ash)(Measured Surface Area of Ash in Additive Sample).

The surface area of ash in the additive sample may be determined by measuring a pure ash sample. In cases of using a partially burned coal ash, it is necessary first to muffle fire the ash to burn off all carbon as CO$_2$. Muffled ash is "barren" ash, i.e. ash with substantially no carbon content.

TABLE III

| SURFACE AREAS OF CARBON SOURCES | | |
|---|---|---|
| Additive Material | Surface Area of Additive m$^2$/g | Effective Surface Area of Carbon in Additive m$^2$/g |
| Activated carbon (100% C) | 1093.2 | 1093.2 |
| Hallmark coal ash (45.9% C) | 31.0 | 66.3 |
| Carbon black (100% C) | 29.3 | 29.3 |
| Virginia coal ash (43.3% C) | 18.0 | 40.5 |
| Lignite ash (15% C) | 6.9 | 44.3 |
| Arapahoe coal ash (1.1% C) | 3.7 | 218. |
| Muffled Arapahoe coal ash | 1.3 | 0 |
| Muffled lignite ash | 0.3 | 0 |
| Muffled Hallmark ash | 0.9 | 0 |

EXAMPLES 1-11

Pursuant to the procedure outlined above, a series of runs were made in the apparatus of FIG. 2 to ascertain the effect of carbon on suppressing NO to NO$_2$ conversion during NaHCO$_3$ sorption of SO$_x$ in hot flue gas. The test parameters of the runs are shown below in Tables IV, Inlet Data, and Table V, Outlet Data, the latter being taken downstream of the filter 36 via Sample Point 2 (See FIG. 2). In these tables: Food grade bicarb is abbreviated "A+H"; "Ash" means barren (muffled) ash, or carbon plus ash, or activated carbon without (ash) carrier; and "g/m" means a feed rate of grams/minute. "C" means carbon. Under "C type", "char" means coal ash with carbon in it (see Table III), "AC" means activated carbon; "CB" means carbon black. "NSR" means Normalized Stoichiometric Ratio of bicarb to SO$_2$.

TABLE IV

INLET DATA

| Example | Bicarb Type | Bicarb Feed Rate g/m | Ash Type* | Ash Feed Rate g/m | C Type | C Feed Rate g/m | C Fraction | Effective Surface Area Carbon in Additive | C Factor | $O_2$ % | $CO_2$ % | CO ppm | $NO_2$ ppm | NO ppm | $NO_x$ ppm | $SO_2$ ppm |
|---|---|---|---|---|---|---|---|---|---|---|---|---|---|---|---|---|
| 1 | A + H | 1.9 | A | 1.9 | Char | 0.1 | .05 | 44.40 | 2.22 | 3.5 | — | — | 20 | 340 | 360 | 695 |
| 2 | A + H | 1.8 | L | 1.3 | Char | 0.3 | .15 | 44.30 | 6.65 | 3.6 | — | — | 16 | 350 | 354 | 713 |
| 3 | A + H | 1.6 | H | 1.3 | Char | 0.3 | .20 | 66.30 | 13.3 | 3.7 | — | — | 15 | 300 | 325 | 660 |
| 4 | A + H | 1.7 | V | 1.0 | Char | 0.70 | .43 | 40.50 | 17.42 | 3.3 | — | — | 15 | 300 | 310 | 710 |
| 5 | A + H | 1.7 | H | 0.95 | Char | 0.78 | .46 | 66.30 | 30.5 | 3.4 | — | — | 15 | 300 | 315 | 725 |
| 6 | A + H | 1.7 | A | 1.7 | AC | 0.04 | .025 | 1093. | 29.51 | 3.5 | — | — | 25 | 340 | 365 | 740 |
| 7 | A + H | 1.8 | A | 1.8 | AC | 0.10 | .05 | 1093. | 56.83 | 3.2 | — | — | 25 | 330 | 340 | 710 |
| 8 | A + H | 1.7 | A | 1.6 | AC | 0.17 | .10 | 1093. | 111.48 | 3.3 | — | — | 14 | 306 | 324 | 731 |
| 9 | A + H | 1.6 | A | 1.3 | AC | 0.3 | .20 | 1093. | 220.78 | 3.2 | — | — | 13 | 310 | 345 | 680 |
| 10 | A + H | 1.6 | A | 1.5 | CB | 0 16 | .10 | 29.30 | 5.11 | 3.1 | — | — | 25 | 300 | 350 | 680 |
| 11 | A + H | 1.6 | A | 1.6 | — | — | .011 | 218.0 | 2.18 | 3.6 | — | — | 25 | 340 | 360 | 715 |

*A = Arapahoe; L = Lignite; H = Hallmark; V = Virginia.

TABLE V

OUTLET DATA

| Example No. | Reactor Temp. °F. | Filter Temp. °F. | NSR | Inlet $SO_2/NO_x$ | Bicarb/Ash | $\Delta SO_2/NO$ | Sodium Utilization | $\Delta NO_x/\Delta SO_2$ | $\Delta NO_2/\Delta SO_2$ |
|---|---|---|---|---|---|---|---|---|---|
| 1 | 365 | 333 | 2.6 | 1.9 | A + H/5% C Lignite | 2.23 | 0.16 | 0.22 | 0.20 |
| 2 | 354 | 330 | 2.4 | 2.0 | A + H/15% C Lignite | 2.52 | 0.27 | 0.21 | 0.17 |
| 3 | 347 | 340 | 2.1 | 2.0 | A + H/Hallmark 20% C | 2.97 | 0.40 | 0.18 | 0.16 |
| 4 | 346 | 367 | 2.2 | 2.3 | A + H/Virginia | 3.42 | 0.32 | 0.19 | 0.104 |
| 5 | 364 | 334 | 2.2 | 2.3 | A + H/Hallmark | 3.38 | 0.33 | 0.14 | 0.11 |
| 6 | 366 | 330 | 2.2 | 2.0 | A + H/Arap. + 2.5% AC | 2.27 | 0.32 | 0.29 | 0.14 |
| 7 | 360 | 350 | 2.4 | 2.1 | A + H/Arap. + 5% AC | 2.6 | 0.31 | 0.26 | 0.091 |
| 8 | 378 | 334 | 2.2 | 2.3 | A + H/Arap. + 10% AC | 2.84 | 0.18 | 0.21 | 0.10 |
| 9 | 358 | 345 | 2.7 | 2.0 | A + H/Arap. 20% AC | 3.38 | 0.32 | 0.17 | 0.08 |
| 10 | 356 | 335 | 2.2 | 1.9 | A + H/Arap. 10% CB | 2.67 | 0.23 | 0.22 | 0.16 |
| 11 | 362 | 324 | 2.1 | 2.0 | A + H/Arap. | 2.13 | 0.29 | 0.31 | 0.18 |

DISCUSSION

FIG. 1 shows the data points for the columns $\Delta NO_2/\Delta SO_2$ (Table V) plotted against C factor (Table IV), which is the product of the C Fraction times the Effective Surface area of Carbon in Additive (both columns in Table IV). In turn, the C Fraction is the percentage of carbon injected, expressed as a decimal fraction. The lower the value of $\Delta NO_2/\Delta SO_2$ means that as more $SO_2$ is removed, less $NO_2$ is present in the outlet gas, or there is less change in the amount of $NO_2$ in the outlet gas. Thus, lower values are desired for suppression of brown plumes. As can be seen from the "best fit" smooth curve of FIG. 1, the suppression of $NO_2$ is a surface area effect, be it a small amount of high surface area carbon (e.g. activated carbon) or a larger amount of lower surface area carbon (e.g. char). Muffled ash with only a small amount of residual carbon (Example 11) shows only a small effect as does a small percentage of a relatively low surface area carbon (char) (Example 1). Compare Example 1 to Example 7 where there is a change from low to high surface area C with the $\Delta NO_2/\Delta SO_2$ going from 0.2 to 0.091.

The intersection of the curve $y = 0.22349 \cdot X^{-0.18863}$ with the ordinate indicates that the amount of $NO_2$ produced for each unit increase in $SO_2$ removal ranges from 1:4 to 1:5 for a C factor of 1. The curve has an $R^2$ of 0.847, indicating an excellent best fit relationship to the data points.

FIG. 1 also shows, surprisingly, that the relationship of C factor to $\Delta NO_2/\Delta SO_2$ is relatively independent of reaction conditions, C+A feed rate, percentage of C, NSR of sorbent, sorbent utilization, and the like. In contrast $NO_2$ production is clearly reaction condition sensitive. The relatively high NSR and low sodium utilization indicates the reactor is inefficient, but the curve indicates independence of the effect on or by NSR.

It should be understood that various modifications within the scope of this invention can be made by one of ordinary skill in the art without departing from the spirit thereof. For example, the carbon/ash or carbon (activated carbon) additive to the sorbent ($NaHCO_3$, sesquicarbonate, trona, carbonated trona, sodium tricarbonate) may be used alone or in conjunction with one or more additives or adjuvants, such as urea, ammonia, and the like. In addition, as seen from reaction (3) above, the carbon alone or in association with a support may be used to reduce $NO_2$ to NO. For example, the high surface area carbon may be formed on or in association with an alumina catalyst-type support, such as an automotive catalytic converter exhaust canister alumina support (pellet or saddle), and used in a converter, or as a secondary converter to reduce auto $NO_2$ emissions. I therefore wish my invention to be defined by the scope of the appended claims as broadly as the prior art will permit, and in view of the specification if need be.

I claim:

1. An $SO_x/NO_x$ air pollution control process comprising in any operative sequence the steps of:
   (a) contacting a gas containing $SO_x$ and $NO_x$ with a sodium-based reagent, said gas having a temperature above about 100° F.;
   (b) contacting said gas with an additive selected from the group consisting essentially of finely divided carbon and finely divided carbon in association with a particulate support in an amount sufficient to suppress NO₂ formation, said additive having a C factor above about 1;

(c) maintaining said reagent and said additive in contact with said flue gas for a time sufficient to react said reagent with some of said $SO_x$ and $NO_x$ thereby reducing the concentration of said $SO_x$ and $NO_x$ in said flue gas;

(d) said additive, as compared to use of said reagent without said additive, suppressing the NO₂ concentration to below about the visible brown plume threshold; and (e) separating said gas, reacted reagent and additive.

2. An $SO_x/NO_x$ air pollution control process as in claim 1 wherein said sodium-based reagent is selected from the group consisting essentially of sodium bicarbonate, Nahcolite, soda ash, trona, carbonated trona, sodium sesquicarbonate, sodium tricarbonate and combinations thereof.

3. An $SO_x/NO_x$ air pollution control process as in claim 2 wherein said reagent is selected from the group consisting essentially of dry Nahcolite and sodium bicarbonate.

4. An $SO_x/NO_x$ pollution control process as in claim 3 wherein said additive is a high surface area carbon.

5. An $SO_x/NO_x$ air pollution control process as in claim 3 wherein said additive is a high surface area carbon in association with fly ash.

6. An $SO_x/NO_x$ air pollution control process as in claim 1 wherein:

(a) said reagent contacting step includes introducing said reagent into said gas in a dry, finely divided condition at a rate in proportion to the amount of $SO_x$ reduction desired; and (b) said additive contacting step includes introducing said additive into said gas in a dry, finely divided form.

7. An $SO_x/NO_x$ air pollution control process as in claim 4 wherein:

(a) said reagent contacting step includes introducing said reagent into said gas in a dry finely divided condition at a rate in proportion to the amount of $SO_x$ reduction desired; and (b) said additive contacting step includes introducing said additive into said gas in dry, finely divided form.

8. An $SO_x/NO_x$ air pollution control process as in claim 5 wherein:

(a) said reagent contacting step includes introducing said reagent in a dry finely divided condition into the gas to be treated at a rate in proportion to the amount of $SO_x$ reduction desired; and (b) said additive is introduced in a dry, finely divided form into said gases substantially coordinate with the point of introduction of said reagent.

9. An $SO_x/NO_x$ air pollution control process as in claim 1 wherein:

(a) said gas is flue gas at a temperature above about 200° F.;

(b) said reagent contacting step includes introducing said reagent in a dry, finely divided condition at a rate in proportion to the amount of $SO_x$ reduction desired; and (c) said additive contacting step includes introducing said additive into said gas in a dry, finely divided form.

10. An $SO_x/NO_x$ air pollution control process as in claim 4 wherein:

(a) said gas is flue gas at a temperature above about 200° F.;

(b) said reagent contacting step includes feeding said reagent in a dry finely divided condition into the flue gas to be treated from a first feeder at a metered rate in proportion to the amount of $SO_x$ reduction desired; and (c) said additive contacting step includes feeding said additive into the flue gas to be treated from a second feeder.

11. An $SO_x/NO_x$ air pollution control process as in claim 5 wherein:

(a) said gas is flue gas at a temperature above about 200° F.;

(b) said reagent contacting step includes feeding said reagent in a dry finely divided condition into the flue gas to be treated from a first feeder at a metered rate in proportion to the amount of $SO_x$ reduction desired; and (c) said additive contacting step includes feeding said additive in a dry, finely divided form into said flue gases substantially coordinate with the point of introduction of said reagent.

12. An $SO_x/NO_x$ air pollution control process as in claim 1 wherein said additive has a C factor above about 5.

13. An $SO_x/NO_x$ air pollution control process as in claim 4 wherein said additive has a C factor above about 5.

14. An $SO_x/NO_x$ air pollution control process as in claim 5 wherein said additive has a C factor above about 5.

15. An $SO_x/NO_x$ air pollution control process as in claim 9 wherein said additive has a C factor above about 5.

16. An $SO_x/NO_x$ air pollution control process as in claim 10 wherein said additive has a C factor above about 5.

17. An $SO_x/NO_x$ air pollution control process as in claim 11 wherein said additive has a C factor above about 5.

18. An $SO_x/NO_x$ air pollution control process as in claim 1 wherein said C factor is above about 40.

19. An $SO_x/NO_x$ air pollution control process as in claim 4 wherein said C factor is above about 40.

20. An $SO_x/NO_x$ air pollution control process as in claim 5 wherein said C factor is above about 40.

21. An $SO_x/NO_x$ air pollution control process as in claim 9 wherein said C factor is above about 40.

22. An $SO_x/NO_x$ air pollution control process as in claim 10 wherein said C factor is above about 40.

23. An $SO_x/NO_x$ air pollution control process as in claim 11 wherein said C factor is above about 40.

24. An $SO_xNO_x$ air pollution control process as in claim 9 wherein said sorbent is used in an amount less than 2.5 NSR, and said additive is used in an amount of from about 5% to about 15% by weight of the sorbent.

25. An $SO_x/NO_x$ air pollution control process as in claim 10 wherein said sorbent is used in an amount less than 2.5 NSR, and said additive is used in an amount of from about 5% to about 15% by weight of the sorbent.

26. An $SO_x/NO_x$ air pollution control process as in claim 11 wherein said sorbent is used in an amount less than 2.5 NSR, and said additive is used in an amount of from about 5% to about 15% by weight of the sorbent.

27. An $SO_x/NO_x$ air pollution control process as in claim 18 wherein said sorbent is used in an amount between about 0.1 to 1.5 NSR, and said additive is used in an amount of from about 5% to about 15% by weight of the sorbent.

28. An $SO_x/NO_x$ air pollution control process as in claim 19 wherein said sorbent is used in an amount between about 0.1 to 1.5 NSR, and said additive is used in an amount of from about 5% to about 15% by weight of the sorbent.

29. An $SO_x/NO_x$ air pollution control process as in claim 20 wherein said sorbent is used in an amount between about 0.1 to 1.5 NSR, and said additive is used in an amount of from about 5% to about 15% by weight of the sorbent.

30. An $NO_2$ air pollution control process comprising in any operative sequence the steps of:
   (a) providing a gas containing $NO_2$ having a temperature above about 200° F.;
   (b) bringing said $NO_2$-containing gas into contact with an additive selected from the group consisting essentially of carbon and carbon in association with a support, said additive having a C factor above about 1;
   (c) maintaining said contact for a time sufficient to convert some of said $NO_2$ to NO, and
   (d) exhausting said gas.

31. An $NO_2$ air pollution control process as in claim 31 wherein:
   (a) said gas is internal combustion engine exhaust gas.

32. An $NO_2$ air pollution control process as in claim 31 wherein:
   (a) said additive is carbon in association with a support.

33. An $NO_2$ air pollution control process as in claim 32 wherein:
   (a) said support is a catalytic converter support.

34. An $NO_2$ air pollution control process as in claim 33 wherein:
   (a) said additive has a C factor above about 5.

35. An air pollution control process as in claim 1 wherein said additive also includes urea.

36. An air pollution control process as in claim 5 wherein said additive also includes urea.

37. An air pollution control process as in claim 20 wherein said additive also includes urea.

38. An air pollution control process as in claim 29 wherein said additive also includes urea.

39. An air pollution control process as in claim 1 wherein said additive also includes ammonia.

40. An air pollution control process as in claim 5 wherein said additive also includes ammonia.

41. An air pollution control process as in claim 19 wherein said additive also includes ammonia.

42. An air pollution control process as in claim 29 wherein said additive also includes ammonia.

43. An $SO_x/NO_x$ air pollution control process comprising in any operative sequence the steps of:
   (a) contacting a gas containing $SO_x$ and $NO_x$ with a sodium based reagent at a temperature above about 200° F.;
   (b) contacting said gas with an additive selected from the group consisting essentially of finely divided carbon and finely divided carbon in association with a particulate support within $R^2 = 0.847 = \pm 0.05$ in accord with the relation $$y = 0.22349 \pm 0.005 \, (x^{-0.18863 \pm 0.002}),$$

where $y = \Delta NO_2/\Delta SO_2$ and $x =$ the C factor;
   (c) said C factor being the product of the fraction of carbon in said additive times the effective surface area of carbon in said additive.

44. An $SO_x/NO_x$ air pollution control process as in claim 43 wherein said sodium-based reagent is selected from the group consisting essentially of sodium bicarbonate, Nahcolite, soda ash, trona, carbonated trona, sodium sesquicarbonate, sodium tricarbonate and combinations thereof.

45. An $SO_x/NO_x$ air pollution control process as in claim 44 wherein said reagent is selected from the group consisting essentially of dry Nahcolite and sodium bicarbonate.

46. An $SO_x/NO_x$ air pollution control process as in claim 45 wherein said additive is a high surface area carbon.

47. An $SO_x/NO_x$ air pollution control process as in claim 45 wherein:
   (a) said gas is flue gas at a temperature above about 200° F.;
   (b) said reagent contacting step includes feeding said reagent in a dry, finely divided condition into the flue gas to be treated from a first feeder at a metered rate in proportion to the amount of $SO_x$ reduction desired; and
   (c) said additive contacting step includes feeding said additive into the flue gas to be treated from a second feeder.

48. An $SO_x/NO_x$ air pollution control process as in claim 46 wherein:
   (a) said gas is flue gas at a temperature above about 200° F.;
   (b) said reagent contacting step includes feeding said reagent in a dry finely divided condition into the flue gas to be, treated from a first feeder at a metered rate in proportion to the amount of $SO_x$ reduction desired; and
   (c) said additive contacting step includes feeding said additive in a dry, finely divided form into said flue gases.

49. An $SO_x/NO_x$ air pollution control process as in claim 44 wherein:
   (a) said gas is flue gas at a temperature above about 200° F.;
   (b) said reagent contacting step includes feeding said reagent in a dry finely divided condition into the flue gas to be treated from a first feeder at a metered rate in proportion to the amount of $SO_x$ reduction desired; and
   (c) said additive contacting step includes feeding said additive in a dry, finely divided form into said flue gases substantially coordinate with the point of introduction of said reagent.

* * * * *